Sept. 25, 1951  V. PALMER  2,569,256

GLASS CUTTING APPARATUS

Filed Aug. 15, 1949

INVENTOR.
Vincent Palmer
BY
ATTORNEY.

Patented Sept. 25, 1951

2,569,256

UNITED STATES PATENT OFFICE 2,569,256

GLASS CUTTING APPARATUS

Vincent Palmer, Kansas City, Mo.

Application August 15, 1949, Serial No. 110,271

3 Claims. (Cl. 33—32)

This invention relates to a device for facilitating the cutting of glass, particularly large panels thereof, the primary object being to provide a stationary support for the panel of glass having thereon a reciprocable cutter swingable to and from a position engaging one face of the glass to perform the cutting operation as the same is reciprocated.

It is the most important object of the present invention to provide glass cutting apparatus having a support including a substantially horizontal portion for receiving the lowermost edge of the panel of glass and a guide mounted in spaced relationship to one face of the glass and in perpendicular relationship to the horizontal portion of the support for slidably receiving a reciprocable carriage having a cutting disc thereon that is held in engagement with the glass as the same is reciprocated on the guide.

Another important object of the present invention is to provide glass cutting apparatus of the above mentioned character wherein the panel of glass is held tightly against a backing piece through the medium of a clamping bar swingable to and from a position against the face of the glass being cut and held biased thereagainst by spring means.

Other objects of the present invention include the way in which the entire guide is easily and quickly removed to permit removal of the cutter carriage; the way in which the cutting disc is held in a position where the depth of cut is selectively maintained; the manner of providing a breaker bar on the backing piece to facilitate the severance of narrow strips of glass on the line of cut; and many other more minor aims and objects, all of which will be made clear or become apparent as the following specification progresses, reference being had to the accompanying drawing, wherein.

Figure 2:
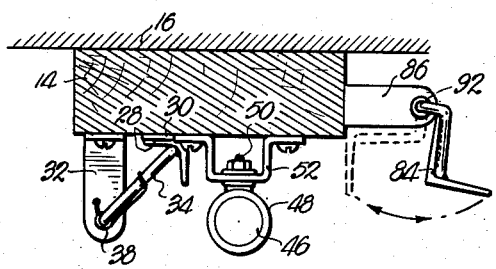
Fig. 2 is an enlarged, fragmentary, cross-sectional view taken on line II—II of Fig. 1 looking in the direction of the arrows.

The handling of relatively large panels of glass is always somewhat of a difficult task and such task is enhanced when cutting thereof becomes necessary. The panel, particularly when relatively thin, will yield under pressure and therefore, it is necessary to provide a good backing surface adjacent the line of cut. Furthermore, the entire panel must be held rigidly, not only while the cutting operation takes place, but prior to the final breaking step. It is difficult for the operator in any event to move a cutting means entirely across the panel because of limited reach.

All of these difficulties and many more, will be overcome through use of the apparatus about to be described.

In the drawing, there is illustrated a stationary support broadly designated by the numeral 10, including a substantially horizontal elongated base member 12 and an upright, elongated backing piece 14. Portions 12 and 14 of the support 10 may or may not be interconnected, but the same are both secured in any suitable manner (not shown) on a wall or the like 16.

Base portion 12 and the lowermost end of the backing piece 14 may additionally be supported by underlying framework. To add to the rigidity between base 12 and backing piece 14, there is provided an angularly disposed interconnecting brace 18. The uppermost face of the base 12 has an inset, elongated, preferably metallic plate 20, secured thereto and extending longitudinally thereof.

Figure 3:
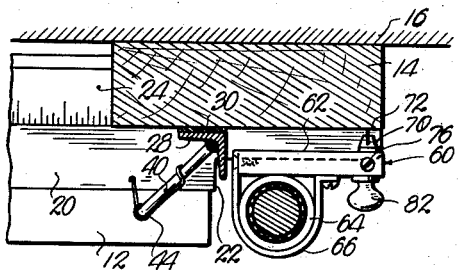
Fig. 3 is an enlarged, fragmentary, cross-sectional view taken on line III—III of Fig. 1 looking in the direction of the arrows.
Figure 4:
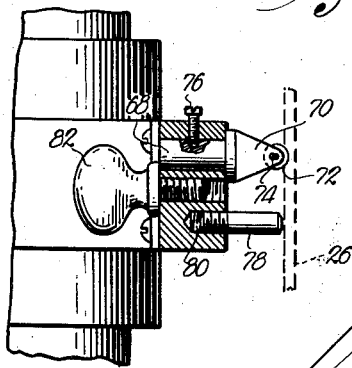
Fig. 4 is an enlarged, detailed, fragmentary, cross-sectional view taken on line IV—IV of Fig. 1, looking in the direction of the arrows.
Figure 1:
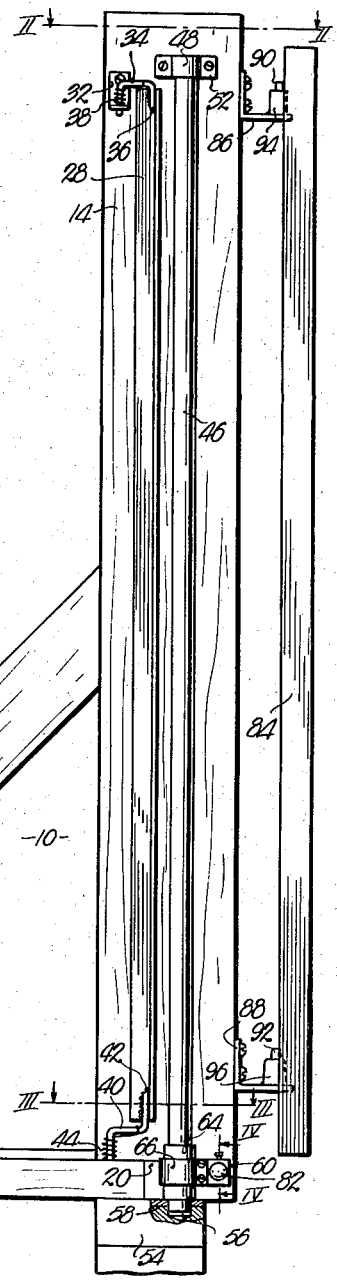
Fig. 1 is a side elevational view of a glass cutting apparatus made in accordance with my present invention, parts being broken away to reveal details of construction.

It is to be noted, as shown most particularly in Figs. 1 and 3, that that end of the base 12 adjacent the backing piece 14, terminates inwardly from the outermost longitudinal edge of the backing piece 14. The plate 20 however, extends beyond said one end of the base 12 as shown in Figs. 1 and 3, but is cut away as at 22 for purposes hereinafter to be made more clear.

The base 20 also carries an elongated scale 24 extending longitudinally thereof upon its uppermost face adjacent the normally rearmost, longitudinal edge of the plate 20.

Figure 5:
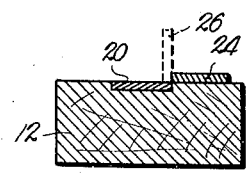
Fig. 5 is a transverse, cross-sectional view taken on line V—V of Fig. 1.

Scale 24 extends from the backing piece 14 to the outermost free end of the base 12 adjacent brace 18. Scale 24 is secured directly to base 12 in any suitable manner and the panel of glass 26 to be cut through use of the apparatus forming the subject matter hereof, rests at its lowermost edge directly upon the flat plate 20 and has its rearmost and lowermost marginal edge bearing flatly against one longitudinal edge of the elongated scale 24, all as clearly illustrated in Fig. 5 of the drawing. That edge of the scale 24 next adjacent the plate 20 is also flush with the front face of backing piece 14 and the latter also serves to receive that face of the glass panel 26 opposite to that face thereof to be cut.

Means for holding the panel of glass 26 against the backing piece 14 includes an elongated clamping bar 28 that is preferably L-shaped in cross-section as illustrated in Figs. 2 and 3, and having one leg thereof provided with a strip of resilient material 30. It is this strip of material 30 that bears against the panel of glass 26 when the clamping bar 28 is in the operative holding position.

Bar 28 extends longitudinally of the backing piece 14 adjacent that longitudinal edge thereof proximal to base 12 and brace 18 and is swingably mounted upon backing piece 14 through the medium of a laterally extending fixture 32 mounted on backing piece 14 adjacent the uppermost end thereof.

Fixture 32 pivotally carries one leg of a U-shaped hinge element 34, the other leg of element 34 being welded or otherwise secured directly to the clamping bar 28 as at 36.

A spring 38 on the hinge element 34 and fixture 32, holds the clamping bar 28 biased toward the backing piece 14. The lowermost end of the clamping bar 28 is swingably mounted upon the base 12 through the medium of a substantially Z-shaped hinge element 40 having one leg thereof welded as at 42 directly to bar 28 and the other leg passing into a socket within base 12.

A spring 44 on hinge element 40 cooperates with the spring 38 in holding the bar 28 biased against the panel of glass 26 when the latter is in the operative position on plate 20.

The backing piece 14 also carries an elongated guide 46 extending longitudinally thereof, guide 46 being preferably circular in cross-section and rotatably and slidably mounted at its uppermost end within a bearing 48.

Bearing 48 is in turn swingably mounted through the medium of a bolt or the like 50 on a bracket 52 that is in turn secured directly to the backing piece 14 adjacent the uppermost end thereof. The lowermost end of the elongated guide 46 extends downwardly beyond the metallic plate 20 in spaced relationship thereto and spaced from the proximal end of the base 12.

A small block 54 on the backing piece 14 and underlying a portion of the base 12, is provided with a socket 56 for receiving the lowermost end of the guide 46, there being a perforated, metallic plate 58 covering socket 56 for receiving the guide 46. Guide 46 thus mounted is in perpendicular relationship to the uppermost face of the plate 20. Guide 46 swingably and slidably receives a carriage broadly designated by the numeral 60.

Carriage 60 includes an arm 62 that is secured to a bearing 64 through the medium of a U-shaped clamp 66. Arm 62 is provided with an opening for receiving a shank 68 of a bifurcated cutter head 70, said head 70 rotatably receiving a cutter disc 72.

Disc 72 is provided with a pair of opposed pintles mounted in elongated slots 74 in head 70. A set screw 76 in arm 62 releasably holds the shank 68 in place. Immediately below the head 70 is a pin 78 extending outwardly from the arm 62 in the same direction as head 70 and threadably mounted in an internally tapped bore 80 formed in arm 62. Arm 62 also carries an operating knob 82 in opposed relationship to the cutter head 70 and the pin 78.

It is seen that through utilization of the bearing 64, arm 62 and head 70 thereon, as well as pin 78, can be reciprocated longitudinally of the guide 46 and swung to and from a position where the cutting disc 72 engages the proximal face of the panel of glass 26.

The outermost longitudinal edge of the backing piece 14 opposite to the brace 18 and the base 12, swingably carries an elongated breaker bar 84 through the medium of a pair of hangers 86 and 88. Bar 84 is preferably L-shaped in cross-section as shown in Fig. 2, and is swingably mounted upon the hangers 86 and 88 that extend laterally from the backing piece 14 through the medium of a pair of substantially Z-shaped hinge members 90 and 92 respectively. The hangers 86 and 88 are provided with sockets 94 and 96 respectively for rotatably receiving one leg of the hinge members 90 and 92 respectively, the other legs thereof being welded or otherwise secured directly to the breaker bar 84.

In use, a panel of glass 26 to be cut is moved into position upon the uppermost face of plate 20 and slid therealong between the clamp bar 28 and the backing piece 14 and between the guide 46 and the proximal face of backing piece 14. The operator can easily grasp the clamping bar 28 and swing the same outwardly away from the backing piece 14 against the action of springs 38 and 44 to permit such movement of the panel of glass 26 into position. The width of glass to be cut can be easily measured through use of the calibrated scale 24. When the panel of glass 26 is against the proximal longitudinal edge of scale 24 and against the forwardmost face of backing piece 14, the same will be held rigidly in position through the medium of clamping bar 28. The operator thereupon grasps the operating knob 82 of carriage 60 and swings the same to a position where the cutting disc 72 engages the proximal face of the panel of glass 26. Reciprocation of the entire carriage 60 throughout the length of the guide 46 will thereupon cause the disc 72 to form a cut in the panel of glass 26. The carriage 60 may be moved along the glass 26 until the cut formed therein is of the desired depth, which depth is determined by the pin 78. As soon as this pin 78 moves to a position where the same slides upon the panel of glass 26, the operator knows that the cut is of the proper depth and of the same depth throughout the length thereof. Obviously, the depth of this cut may be varied to suit the desire of the operator and also varied in accordance with the thickness of the panel of glass being cut by simply rotating the pin 78 inwardly or outwardly within the tapped bore 80.

When relatively wide strips of glass are cut, the operator then merely releases the clamping bar 28, removes the panel of glass from the apparatus and through the usual tapping operation, breaks the glass along the line of cut. When, however, relatively narrow strips are cut from the panel 26, the operator may utilize the breaker bar 84 in effecting the final breaking operation. The cut glass is moved outwardly toward the breaker bar 84 after releasing clamping bar 28 until the line of cut is adjacent the outermost longitudinal edge of the backing piece 14. The breaker bar 84 is thereupon swung from the normal position shown in Fig. 1, and in full lines in Fig. 2 to the position shown by dotted lines in Fig. 2. By a gentle tap of the bar 84 against the glass, severing will take place along the line of cut.

When it is desired for any reason to remove the guide 46 from the backing piece 14, or to remove the carriage 60 from the guide 46, the operator merely slides guide 46 upwardly within the bearing 48 to release the lowermost end of guide 46 from socket 56. Guide 46 thereupon can be swung laterally because of the pivotal connection 50, the carriage 60 can be removed from the lowermost end of guide 46, and, if desired guide 46 can be moved downwardly from within bearing 48.

It is also apparent that both the clamping bar 28 and the breaker bar 84 can be entirely removed from the backing piece 14 because of the manner of mounting of the hinge elements 34 and 40 and the hinge members 90 and 92.

It is apparent that all of the aforementioned difficulties and hazards of handling and cutting large panels of glass are met by the apparatus forming the subject matter hereof. The entire structure is easily, simply and inexpensively manufactured and can be placed in use without the requirement of exceptional skill. Furthermore, the device is subject to many changes and modifications over and above the single modification chosen for illustration, and, therefore, it is manifest that it is desired to be limited only by the spirit of this invention as defined by the scope of the appended claims.

Having thus described the invention, what is claimed as new and desired to be secured by Letters Patent is:

1. In glass cutting apparatus, a base; an upright backing member; an elongated guide on the backing member in spaced parallelism to one face thereof and perpendicular to the base; structure slidably receiving the guide at one end thereof for movement on the longitudinal axis of the latter; means swingably securing said structure to said one face of the backing member; releasable mounting means for the guide at the opposite end thereof; and a cutter head mounted on the guide for reciprocation between said structure and said mounting means.

2. In glass cutting apparatus, a base; an upright backing member; an elongated guide on the backing member in spaced parallelism to one face thereof and perpendicular to the base; structure slidably receiving the guide at one end thereof for movement on the longitudinal axis of the latter; means swingably securing said structure to said one face of the backing member; releasable mounting means for the guide at the opposite end thereof; a cutter head mounted on the guide for reciprocation between said structure and said mounting means, said guide extending below the base in spaced relationship to one end of the latter; and a plate on the base, said plate extending at one end thereof beyond said one end of the base between the guide and the backing member.

3. A cutting carriage for glass cutting apparatus comprising a perforated arm; a bearing on the arm adapted for mounting upon a guide; a cutter head having a shank in the perforation of said arm and a rotatable cutting disc spaced from one face of the arm; releasable means for holding the shank in selected positions within said perforation; and a retractile pin carried by the arm and extending from said face thereof for controlling the depth of cut by said disc.

VINCENT PALMER.

REFERENCES CITED

The following references are of record in the file of this patent:

UNITED STATES PATENTS

| Number | Name | Date |
| --- | --- | --- |
| 453,867 | Monce | June 9, 1891 |
| 1,117,736 | Whittemore | Nov. 17, 1914 |
| 1,710,898 | Rowley | Apr. 30, 1929 |
| 2,013,216 | McCarthy | Sept. 3, 1935 |
| 2,132,452 | Zwick | Oct. 11, 1938 |
| 2,254,541 | Nordgren | Sept. 2, 1941 |